March 30, 1948.  LE ROY L. WERNER  2,438,527
CONVEYOR SUPPORT
Filed Nov. 27, 1943  4 Sheets-Sheet 2
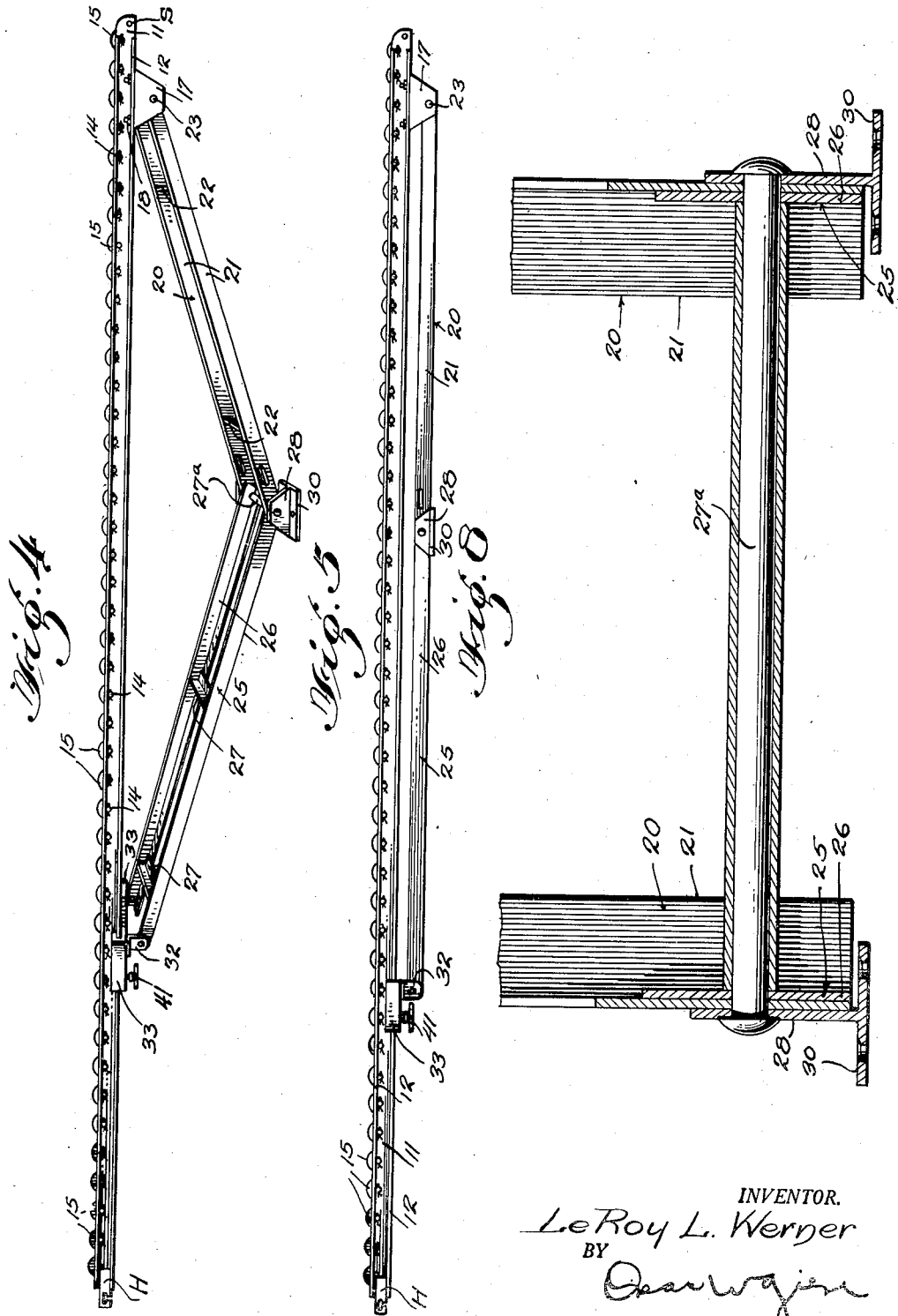
INVENTOR.
LeRoy L. Werner
BY
ATTORNEY

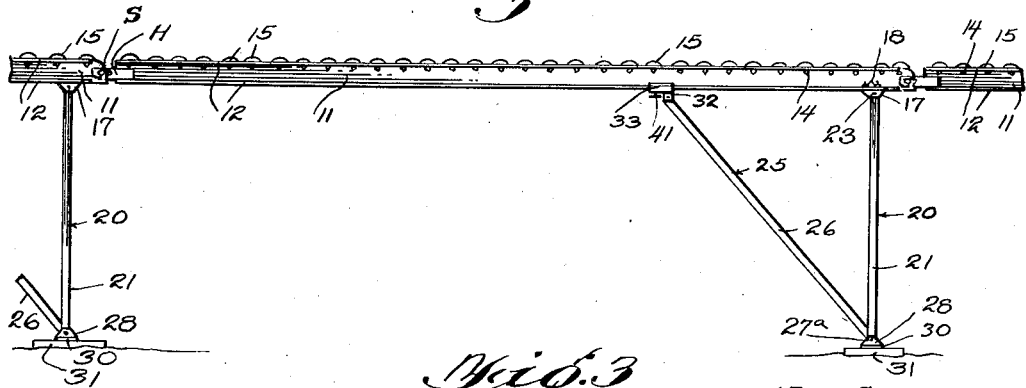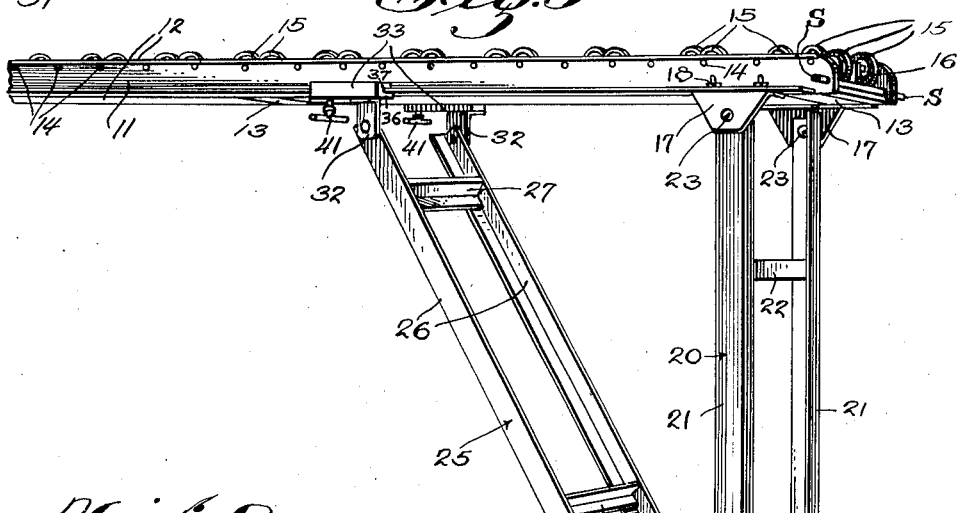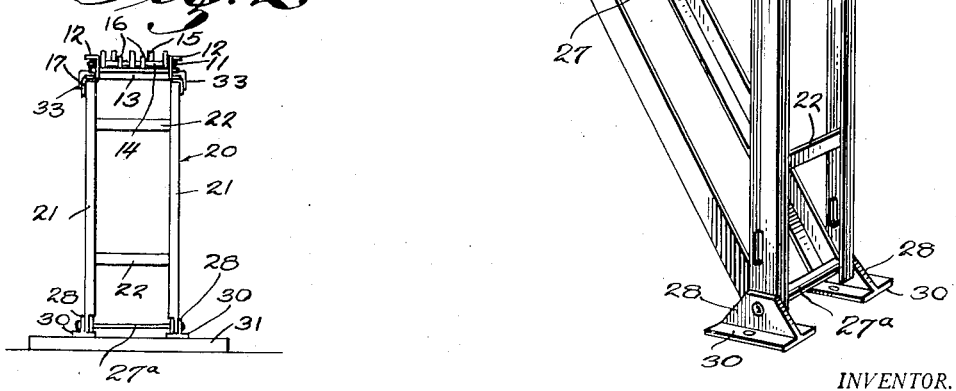

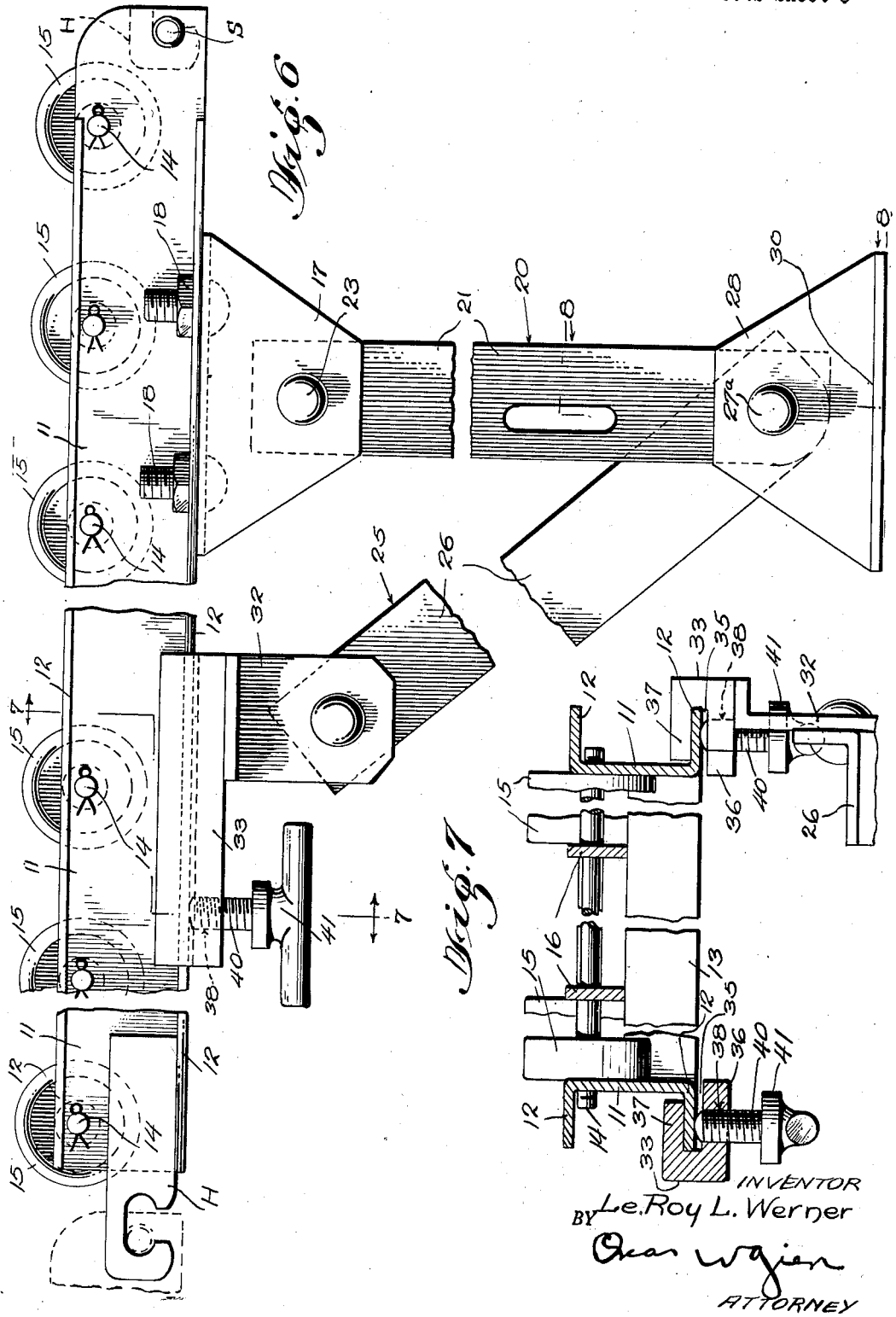

March 30, 1948. LE ROY L. WERNER 2,438,527
CONVEYOR SUPPORT
Filed Nov. 27, 1943 4 Sheets-Sheet 4

INVENTOR.
Le Roy L. Werner
BY
ATTORNEY

Patented Mar. 30, 1948

2,438,527

UNITED STATES PATENT OFFICE 2,438,527

CONVEYOR SUPPORT

Le Roy L. Werner, Washington, D. C.

Application November 27, 1943, Serial No. 511,925

7 Claims. (Cl. 193—35)

(Granted under the act of March 3, 1883, as amended April 30, 1928; 370 O. G. 757)

The invention described herein, if patented, may be manufactured and used by or for the Government for governmental purposes, without the payment to me of any royalty thereon.

This invention relates to conveying apparatus, and more particularly to portable sectional conveyors for use in transporting material, containers and articles of merchandise.

Conveyors are now employed in warehouses, storage depots and loading stations, and these conveyors are usually formed of interconnected sections in which each section is supported by a detachable support. These supports are usually provided with adjustable components which engage braces or brackets forming integral parts of the conveyor frame. In assembling the conveyor, one section is hooked or locked to another, and each section is supported by one or more adjustable supports. These supports are adjusted so that each section is inclined to permit the articles being transported to gravitate along the conventional roller surface of the conveyor. After use the conveyor is dismantled and stored away for future use, and, in storage, the conveyor sections are usually stacked together. The detachable supports also are stored away in a convenient or available location. In reassembling the conveyor for use in another location, it is frequently found that some of the supports have been misplaced or lost, thus causing prolonged delay before the complete conveyor is assembled for use. Furthermore, each support usually has a single adjustable component which engages a conveyor section, so that the length of each load-supporting span is determined by the distance the supports are spaced apart. These supports are usually spaced apart a distance equal to the length of a section, consequently, it is necessary that the frame of each section be made of relatively heavy material in order to provide the requisite strength to avoid excessive deflection and vibration in use.

It is, therefore, an object of this invention to provide a portable sectional conveyor in which each section has an attached adjustable support which is constructed and arranged to support the section at two points along its span, thereby dividing the span of each section by reducing the distance between load-supporting points.

Another object of this invention is to provide a portable conveyor section having an adjustable support which is constructed and arranged to provide relatively great adjusting flexibility, to thereby provide sufficiently wide adjusting range to meet all adjusting requirements.

A further object of this invention is to provide a portable conveyor section having an adjustable support which is constructed and arranged to define a truss that utilizes a portion of each conveyor rail as a chord of the truss, thereby reducing or dividing the span of the conveyor frame to provide sufficient rigidity and strength in the structure to eliminate excessive deflection and vibration.

An additional object of this invention is to provide a portable conveyor section having a foldable support permanently secured thereto, the support being constructed and arranged to fold or collapse to parallel relation to the rail of the conveyor, thus greatly reducing the storage space required for the sections while not in use.

Another object of this invention is to provide a portable conveyor section having a foldable support permanently secured thereto, the support being constructed and arranged to fold or collapse to closely nested relation with the frame of the conveyor section when not in use, the support also being constructed and arranged to permit the support to be automatically erected by merely lifting the frame to the desired height and locking the component of the support.

Another object of this invention is to provide a portable conveyor section having a foldable support permanently secured thereto, the components of the entire structure being formed of standard material of relatively light gauge which may be conveniently and expeditiously fabricated thereby reducing the production costs.

It is also an object of this invention to provide a portable conveyor section of generally improved construction, whereby the device will be simple, durable and inexpensive in construction, as well as convenient, practical, serviceable, and efficient in its use.

With the foregoing and other objects in view, which will appear as the description proceeds, the invention resides in the combination and arrangement of parts and in the details of construction herein described and claimed, it being understood that various changes in form, proportion and minor details of construction may be made within the scope of the claims without departing from the spirit or sacrificing any advantages of the invention.

A complete disclosure of the invention and detail description thereof will now be given in connection with the drawings forming a part of the specification herein:

Figure 1 is a diagrammatic side elevation depicting a plurality of the improved conveyor sections in erected or conveying position;

Figure 2 is a diagrammatic end elevation of an erected conveyor section;

Figure 3 is a perspective view of a conveyor section depicted as adjusted to erected or conveying position;

Figure 4 is a similar view, but showing the section as adjusted to a different conveying position;

Figure 5 is a side elevation depicting the conveyor section in folded or storage condition;

Figure 6 is an enlarged fragmental side elevation depicting the components of the conveyor section in partially unfolded condition;

Figure 7 is a transverse vertical sectional view taken on the line 7—7 of Figure 6;

Figure 8 is a transverse sectional view taken on the line 8—8 of Figure 6.

Figure 10:
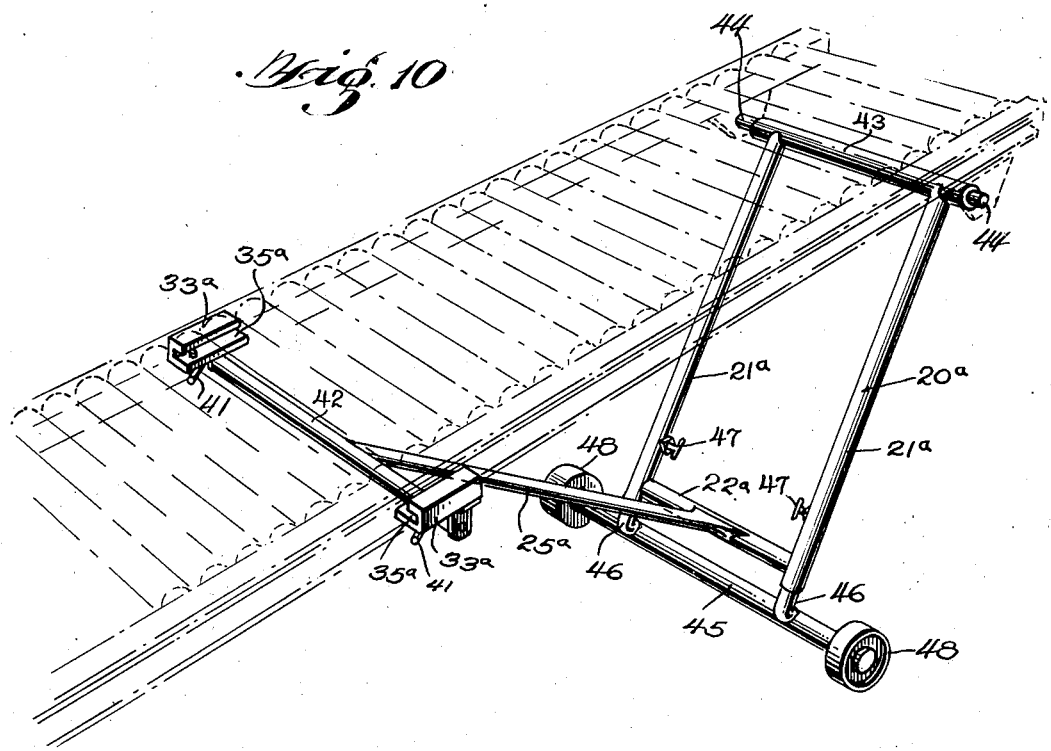
Figure 10 is a perspective depicting a modified form of the invention.
Figure 9:
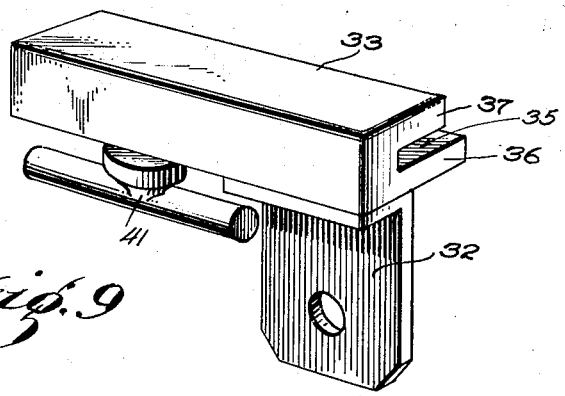
Figure 9 is a perspective view of a clamping head.

Referring to the drawings, in which corresponding parts are indicated by similar reference characters, there is depicted a gravity conveyor formed of a plurality of sections. Each section includes a frame formed by spaced parallel frame components or rails 11 having laterally-extending flanges 12, and the rails are tied together in spaced parallel relation by a plurality of crossed members or braces 13 of conventional construction. Any preferred conveying instrumentalities may be supported by the frame, but a preferred arrangement is one in which conveyor rollers or wheels are employed in conformity with the usual practice in gravity conveyors. In a preferred form, the frame supports a plurality of transversely-extending rods 14, and these rods operably support a plurality of conveyor wheels 15. The rods 14 are preferably reinforced by longitudinally-extending supporting bars 16 through which the rods extend at spaced intervals. By this arrangement, a continuous conveyor surface is provided which presents antifriction wheels to the material, containers or articles of merchandise to be conveyed therealong by the action of gravity.

Opposed angle brackets 17 are secured to the rails 11 adjacent one terminal of the conveyor by bolts 18, or other suitable securing devices. A composite supporting leg 20 is formed of spaced parallel angle members or supports 21 having transversely extending braces or cross members 22 secured thereto, thus providing a rigid supporting structure. The upper terminal of each angle member 21 is pivotally secured to a bracket 17 by means of rivets 23, bolts, or other suitable securing devices.

A second composite supporting leg 25 is provided, and this leg includes spaced parallel angle members or components 26 which are rigidly united by a plurality of cross members or braces 27. The lower terminals of the supporting legs 20 and 25 are pivotally secured to each other by a bar or rod 27a which extends transversely through the angle components of the legs and also through attaching ears or flanges 28 which extend perpendicularly from supporting flanges 30 of adjusting shoes. The flanges 30 of the adjusting shoes are preferably provided with apertures for the reception of bolts, screws, or other securing devices, which secure the shoes to a transversely-extending base member 31 which engages the floor, ground or other supporting surface.

The upper terminals of each angle member 26 of the composite leg 25 is secured to an attaching lug 32 which extends from a slide block or clamp member 33. Each slide block 33 is provided with a recess 35 which defines a base flange 36 and an overhanging flange 37 which straddle the lower flange 12 of each rail 11 to permit the clamp member 33 to freely slide longitudinally along each rail. The base flange 36 of each slide block 33 has a threaded aperture 38 formed therein for the reception of a locking or set screw 40 having a manipulating handle or head 41. By this arrangement, each clamp member 33 may be conveniently locked to each rail 11 by simply rotating its screw 40 sufficiently to cause its inner terminal to engage the lower surface of the straddled flange 12.

Each conveyor section is preferably provided with conventional hooks H at one terminal and laterally-extending pins or studs S at its opposed terminal, whereby the sections are united in the usual manner to form a continuous conveyor.

In use, the locking or set screws 40 are manipulated to release the clamp members or blocks 33 for sliding movement along the flanges 12 of the rails 11. In moving the clamp members 33, the legs 20 and 25 move about their pivotal connections with each other and with the conveyor frame, so that the section is supported at the desired height from the supporting surface. Inasmuch as the sections are arranged so that the articles being transported gravitate along their roller surfaces, each section is preferably disposed so that one terminal is higher than its opposed terminal, thereby inclining the supporting surface of the conveyor sufficiently to permit the articles to gravitate freely therealong.

When the components have been adjusted to support each elevator section at the desired height, the set screws 40 are manipulated to lock the clamp members or blocks 33 to the flanges 12 or the rails 11, thus rigidly securing the supporting legs 20 and 25 in fixed relation to the conveyor section, and inasmuch as one section is hooked or secured to an adjacent section, the unsupported terminal of each section is supported by the adjacent section, thus providing a continuous conveyor in which each section is provided with an adjustable support. By this arrangement, the pivotally connected supporting legs 20 and 25 combine with a portion of each side rail to define a truss structure in which the chord of the truss is defined by the portion of the rail which lies between the upper terminals of the legs, thereby dividing the supporting span of each conveyor section.

From the foregoing, it will be observed that applicant's improved construction and arrangement provides a portable conveyor section that presents relatively great flexibility in adjusting range and rigidity of construction, which rigidity is enhanced by the truss type supporting legs which divide the load-supporting span and also eliminate excessive deflection and vibration in the use of the conveyor. Furthermore, the pivotally connected legs are arranged so that they may be folded flat against or in parallel relation to the frame of the conveyor section, thus permitting the section to be stored away in a relatively small space. Each section may be conveniently erected for use by simply releasing the set screws 40 and lifting the conveyor section to the required height. As the section is elevated to the desired height, its supporting legs gravitate to permit the supporting shoe or base to engage the supporting surface. The set screws 40 are then manipulated to lock the clamp members 36 to the flanges 12 of the rails 11, thus presenting a quickly-assembled rigid support. Inasmuch as the supporting legs form permanent components of the conveyor section, no time will be lost in searching for lost or misplaced supports. Furthermore, the entire device may be produced at a relatively low cost, because standard material sections are employed in its construction, which materials may be secured at a relatively low initial cost and which may be inexpensively fabricated.

A modified form of the invention is depicted in Figure 10, in which form spaced clamp members 33a are pivotally secured to a cross bar or spacer member 42, and each clamp member 33a is provided with a longitudinally-extending recess 35a which engages and slides along the lower flange 12 of a conveyor rail 11. A supporting leg 25a is secured to the spacer member 42, and its opposed terminal is secured to a cross member 22a which is pivotally secured to spaced parallel tubular leg members 21a or a composite leg 20a. The upper terminals of the tubular leg components 21a are united by a cross member or brace 43 which has its opposed terminals pivotally secured to the rails 11 of the conveyor, as indicated in 44.

A supporting axle 45 is provided which has spaced parallel leg components or bars 46 extending therefrom, which bars are telescopically received within the tubular leg components 21a and are secured thereto by winged set screws 47. The axle 45 has ground-engaging or supporting wheels 48 rotatably secured to its opposed terminal.

This form of the invention is similar to the arrangement heretofore disclosed, except that the length of the composite supporting leg 20a may be adjustably varied to support the conveyor section at any desired height.

Having thus described the invention, what I claim as new and useful is:

1. A conveyor having side rails to support conveyor members, a first leg pivotally secured to the end portion of a side rail, said first leg supporting said rail at a variable angle including the range of 0° and 90°, a clamp member slidable along the rail, a second supporting leg pivotally secured to the lower end portion of the first leg and pivotally secured to the clamp member, ground-engaging means supporting the legs, the legs being movable about their pivotal connections as the clamp member slides along the rail to adjustably vary the height at which the legs support the conveyor, and means for securing and locking the clamp member in fixed relation to the rail.

2. A conveyor including a frame, a first leg pivotally secured to the end portion of the frame, said first leg supporting said frame at a variable angle including the range of 0° and 90°, a second supporting leg pivotally secured to the lower end portion of the first leg, a clamp member slidable along the frame and pivotally secured to the second leg, said member being movable to vary the height of the conveyor and to permit said legs to spread parallel to the frame, and means for securing and locking said member to the frame in either supporting or spread position.

3. A portable conveyor section including side rails to support conveyor members, a first leg pivotally secured to the end portion of the rails, said first leg supporting said rails at a variable angle including the range of 0° and 90°, a second supporting leg pivotally secured to the lower end portion of the first leg, ground-engaging means movably secured to and supporting the legs, clamp members slidable along the rails and pivotally secured to the second supporting leg, said members being movable to vary the height of the conveyor and to permit said legs to spread parallel to the rails, and means for securing and locking said members to the rails in either supporting or spread positions.

4. A conveyor having side rails to support conveyor members, a first leg including spaced parallel components, each component being pivotally secured to the end portion of a side rail, and supporting said rail at a variable angle including the range of 0° and 90°, a clamp member slidable along each rail, a second supporting leg including spaced parallel components, each component of the second leg being pivotally secured to the lower end portion of a component of the first leg, means for pivotally securing the components of the second leg to the clamp members, ground-engaging means supporting the legs, said members being movable to vary the height of the conveyor and to permit said legs to spread parallel to the rails, and means for securing and locking said members to the rails in either supporting or spread positions.

5. A portable conveyor section including side rails having laterally-extending flanges, a first leg pivotally secured to the end portion of the rails, said first leg supporting said rails at a variable angle including the range of 0° to 90°, a second supporting leg pivotally secured to the lower end portion of the first leg, ground-engaging means movably secured to and supporting the legs, clamp members slidable along the flanges and pivotally secured to the second supporting leg, said members being movable to vary the height of the conveyor and to permit said legs to spread parallel to the rails, and means for securing and locking said members to the rails, in either supporting or spread positions.

6. A conveyor having a frame, a first leg pivotally secured to the end portion of the frame, said first leg supporting said frame at a variable angle including the range of 0° and 90°, a clamp member slidable along the frame, a second supporting leg pivotally secured to the lower end portion of the first leg and to the clamp member, ground engaging means comprising an adjustable extension of the first leg, said members being movable to vary the height of the conveyor and to permit said legs to spread parallel to the rails, and means for securing and locking said members to the rails, in either supporting or spread positions.

7. A portable conveyor section including side rails to support conveyor elements, adjustable leg structure supporting said conveyor section including a first member pivotally secured to an end portion of the side rails, a second member pivotally secured to the first member, ground-engaging means movably secured to one of said members, slides adjustable along the rails and pivotally secured to the second member, said slides being movable to a plurality of positions to vary the height at which the conveyor is supported or to permit said members to spread to a position substantially parallel to the rails, and means for clamping said slides to the rails in either supporting or spread positions.

LE ROY L. WERNER.

REFERENCES CITED

The following references are of record in the file of this patent:

UNITED STATES PATENTS

| Number | Name | Date |
|---|---|---|
| 714,432 | Alvey | Nov. 25, 1902 |
| 747,952 | Dillon | Dec. 29, 1903 |
| 1,471,763 | Wentz | Oct. 23, 1923 |
| 2,199,097 | Chappelle | Apr. 30, 1940 |
| 2,347,308 | Woldring et al. | Apr. 25, 1944 |

FOREIGN PATENTS

| Number | Country | Date |
|---|---|---|
| 80,423 | Austria | Apr. 10, 1920 |